US010296956B2

(12) United States Patent
Shi et al.

(10) Patent No.: US 10,296,956 B2
(45) Date of Patent: May 21, 2019

(54) METHOD, SYSTEM, AND COMPUTER-READABLE MEDIUM FOR PRODUCT AND VENDOR SELECTION

(71) Applicant: SAP SE, Walldorf (DE)

(72) Inventors: Zhan Shi, Beijing (CN); Yu Cheng, Shanghai (CN); Gufei Sun, Shanghai (CN); Wen-Syan Li, Shanghai (CN)

(73) Assignee: SAP SE, Walldorf (DE)

( * ) Notice: Subject to any disclaimer, the term of this patent is extended or adjusted under 35 U.S.C. 154(b) by 587 days.

(21) Appl. No.: 14/596,219

(22) Filed: Jan. 14, 2015

(65) Prior Publication Data

US 2016/0203540 A1 Jul. 14, 2016

(51) Int. Cl.
*G06Q 30/00* (2012.01)
*G06Q 30/06* (2012.01)
*G06F 16/2457* (2019.01)

(52) U.S. Cl.
CPC ... *G06Q 30/0625* (2013.01); *G06F 16/24578* (2019.01)

(58) Field of Classification Search
CPC .................. G06Q 30/0625; G06F 17/3053
USPC ......................................................... 705/26.62
See application file for complete search history.

(56) References Cited

U.S. PATENT DOCUMENTS

| | | | |
|---|---|---|---|
| 5,983,200 A * | 11/1999 | Slotznick ............ | G06Q 10/025 705/1.1 |
| 6,092,049 A | 7/2000 | Chislenko et al. | |
| 6,976,006 B1 | 12/2005 | Verma et al. | |
| 7,788,124 B2 | 8/2010 | Fotteler et al. | |
| 7,890,499 B1 * | 2/2011 | Boswell ............ | G06F 17/30864 707/722 |
| 7,966,334 B1 | 6/2011 | Bezos et al. | |
| 8,027,864 B2 | 9/2011 | Gilbert | |
| 8,060,466 B1 | 11/2011 | Round et al. | |
| 8,533,056 B2 | 9/2013 | Schory et al. | |
| 2001/0021914 A1 | 9/2001 | Jacobi et al. | |
| 2002/0128959 A1 * | 9/2002 | Kostic ................... | G06Q 40/04 705/37 |

(Continued)

OTHER PUBLICATIONS

Ranking model adaptation for domain specific mining using binary classifier for sponsored ads; Published in: Dec. 1, 2014 ; 14th International Conference on Hybrid Intelligent Systems; ISBN (Electronic): 978-1-4799-7633-1; (Year: 2014).*

*Primary Examiner* — Jeffrey A. Smith
*Assistant Examiner* — Lalith M Duraisamygurusamy
(74) *Attorney, Agent, or Firm* — Fish & Richardson P.C.

(57) ABSTRACT

Disclosed herein are technologies for providing recommendations as to particular products and/or services that are customer specific and general, based on customer preference and inquiry. The recommendations are provided as part of an online shopping system. In accordance with one aspect, an item query is received from a customer, and analyzed by a query analyzer to determine if the query is a general item query or a specific item query. A search may be performed for items based on the item query in an items database listing items offered for purchase. If the query is the general item query, customer preference is determined from results of the search. If the query is the specific item query, the items from the results of the search are grouped based on cost performance. The items of the search result are ranked and provided to the customer.

20 Claims, 10 Drawing Sheets

(56) References Cited

U.S. PATENT DOCUMENTS

| | | | |
|---|---|---|---|
| 2002/0161627 A1* | 10/2002 | Gailey | G06F 17/30867 |
| | | | 186/35 |
| 2003/0028451 A1 | 2/2003 | Ananian | |
| 2003/0105682 A1 | 6/2003 | Dicker et al. | |
| 2006/0131382 A1* | 6/2006 | Thatcher | G06Q 30/02 |
| | | | 235/376 |
| 2007/0156505 A1 | 7/2007 | Agassi et al. | |
| 2009/0234784 A1 | 9/2009 | Buriano et al. | |
| 2009/0271390 A1* | 10/2009 | Zheng | G06F 17/3097 |
| 2010/0153215 A1* | 6/2010 | Abraham | G06F 17/30867 |
| | | | 705/14.55 |
| 2011/0078157 A1* | 3/2011 | Sun | G06Q 30/02 |
| | | | 707/749 |
| 2011/0213638 A1* | 9/2011 | Omatsu | G06Q 30/02 |
| | | | 705/7.29 |
| 2011/0295722 A1* | 12/2011 | Reisman | G06Q 30/0201 |
| | | | 705/27.1 |
| 2013/0024448 A1* | 1/2013 | Herbrich | G06F 17/30864 |
| | | | 707/728 |
| 2013/0035985 A1 | 2/2013 | Gilbert | |
| 2013/0091034 A1 | 4/2013 | Gudmundsson | |
| 2013/0097056 A1* | 4/2013 | Sun | G06Q 10/00 |
| | | | 705/26.35 |
| 2014/0040073 A1 | 2/2014 | Kirovski et al. | |
| 2014/0207620 A1* | 7/2014 | Nickerson | G06Q 30/0623 |
| | | | 705/26.61 |

* cited by examiner

---
Algorithm 1 Query Analyzer
---
Define:
    User's query, $Q$
    Label of Items, $L_i$
    Similarity between $Q$ and $L_i$, $S_i$
    $\Omega = 1, 2, \ldots, N$ 1:   for $i \in \Omega$ do
2:       if $S_i = \min(S_i, i \in \Omega)$ then
3:           $Q \in L_i$
4:       end if
5:   end for
6:   if $L_i$ is a leaf node then
7:       Specific module
8:   else
9:       General module
10:  end if

METHOD, SYSTEM, AND COMPUTER-READABLE MEDIUM FOR PRODUCT AND VENDOR SELECTION

TECHNICAL FIELD

The present disclosure relates generally to allowing users to request and receive specific data/information from network or cloud based application or solution provider.

BACKGROUND

With the advent of electronic or E-commerce, customer-to-customer (C2C) online shopping has become and continues to grow as a popular business model. In typical E-commerce platforms, business transactions may be conducted directly between individual vendors and customers. E-commerce C2C provides a free and wide-open market for people to find the products and services they desire. Downsides include the problem of finding appropriate products and services, and distinguishing authentic from fake goods. Ideally, product and vendor should be considered together during transactions.

Product or item retrieval is a core part of online shopping platforms. A product or item retrieval system presents appropriate products from an overwhelming number of available products to users/customers. A typical product or item retrieval system may include an index of items created by an index operator. The most relevant items corresponding to customer's query is retrieved. Results of the retrieved items may be arranged by a ranking model according to the scores from a ranking function.

However, such conventional retrieval systems are not efficient or effective. For example, conventional item retrieval systems do not take into consideration the personality of users. In other words, for a given query, an item retrieval system returns the same result for every customer. For example, two customers, customer 1 and customer 2, desire to buy "t-shirts" from the online shopping platform. Customer 1 prefers brand name "t-shirts" with a higher quality. Customer 2 prefers "t-shirts" with a lower price. The typical item retrieval system would return the same layout of a website based on facts such as release date and turnover. Because of this, "t-shirts" with larger sale volumes or new releases are ranked at the top of the retrieval result. The ranked result of items that are distributed in the entire price range may not suitable for both customer 1 and customer 2 in this case. This may result in one customer spending longer time before finding the desired item to purchase.

Furthermore, conventional retrieval systems may not have insight as to a customer's search motivation from key words of a searching input, which is useful in the awareness of what a retrieval order should be. For example, a user may input key words of "basketball shoes" and another may input "AIR JORDAN". This imply different requirement from the customer's viewpoints. Searching for "basketball shoes" usually indicates that the customer desires to buy basketball shoes, without context as to the customer's preference, such as brand or price range. As such, a comprehensive listing, including the most popular items should be helpful. In contrast, the user who wants to find an "AIR JORDAN" knows quite well about what he or she wants. For example, the user has an expectation of high quality and at a price that commensurate with such quality. In such case, the system should provide specific items from various dimension (e.g., cost performance). Branded shoppers and cost conscious or bargain shoppers may have different objectives. Customizing a search result allows consideration of a shopper's preference, thus making online shopping more efficient and pleasurable for customers.

From the foregoing discussion, it is desirable to provide an effective and efficient online shopping platform.

SUMMARY

Disclosed herein are technologies to provide recommendations as to particular products and/or services that are customer specific and general, based on customer preference and inquiry. The recommendations are provided as part of an online shopping system.

In accordance with one aspect, a computer-implemented method for the online shopping platform includes receiving an item query from a customer. The query may be analyzed by a query analyzer to determine if the query is a general item query or a specific item query. A search may be performed for items based on the item query in an items database listing items offered for purchase. If the query is the general item query, customer preference is determined from results of the search. If the query is the specific item query, the items from the results of the search are grouped based on cost performance. The items of the search result are ranked and provided to the customer.

In another aspect, an online shopping platform is disclosed. The online shopping platform includes a query analyzer for receiving a search query from a customer. The query analyzer analyzes the query to determine if the query is a general item query or a specific item query. An items database is included which stores items offered for sale. The online shopping platform includes a general retrieval module with a user behavior component for determining customer preference of the customer and a personalized ranking model component for ranking results retrieved from the items database. The general retrieval module searches the items database and returns a general search result containing general search items based on the general item query. The general search items are ranked based on customer preference to generate a personalized ranked general search result. The platform includes a specific retrieval module having an item price-quality relationship component. The specific retrieval module searches the items database and returns a specific search result containing specific search items based on the specific item query. The specific search items are grouped based on cost performance of specific search items.

In another aspect, a non-transitory computer-readable medium having stored thereon program code is disclosed. The program code is executable by a computer for providing personalized search in an online shopping platform. An item query from the customer is received by the online shopping platform. The query is analyzed by a query analyzer to determine if the query is a general item query or a specific item query. If the query is the general item query, a general item search is performed in an items database containing items offered for sale by a general retrieval module using the general item query to retrieve general search items. The general search items are ranked based on customer preference. If the query is the specific item query, a specific item search in the items database is performed by a specific retrieval module using the specific item query to retrieve specific search items. The specific search items are grouped based on cost performance, and ranked.

With these and other advantages and features that will become hereinafter apparent, further information may be obtained by reference to the following detailed description and appended claims, and to the figures attached hereto.

BRIEF DESCRIPTION OF THE DRAWINGS

The Detailed Description references the accompanying figures. In the figures, the left-most digit(s) of a reference number identifies the figure in which the reference number first appears. The same numbers are used throughout the drawings to reference like features and components.

DETAILED DESCRIPTION

Described herein are a system and method to provide product/service and vendor recommendations to customers based on general and specific inquiries by the customers. The term "product" may refer to either a product or service or combination of both. A personalized online shopping platform is provided. This system may include two item retrieval modules. One module for specific item information retrieval which may be called a "specific retrieval module" and a module for comprehensive exploration which may be called a "general retrieval module."

Figure 1:
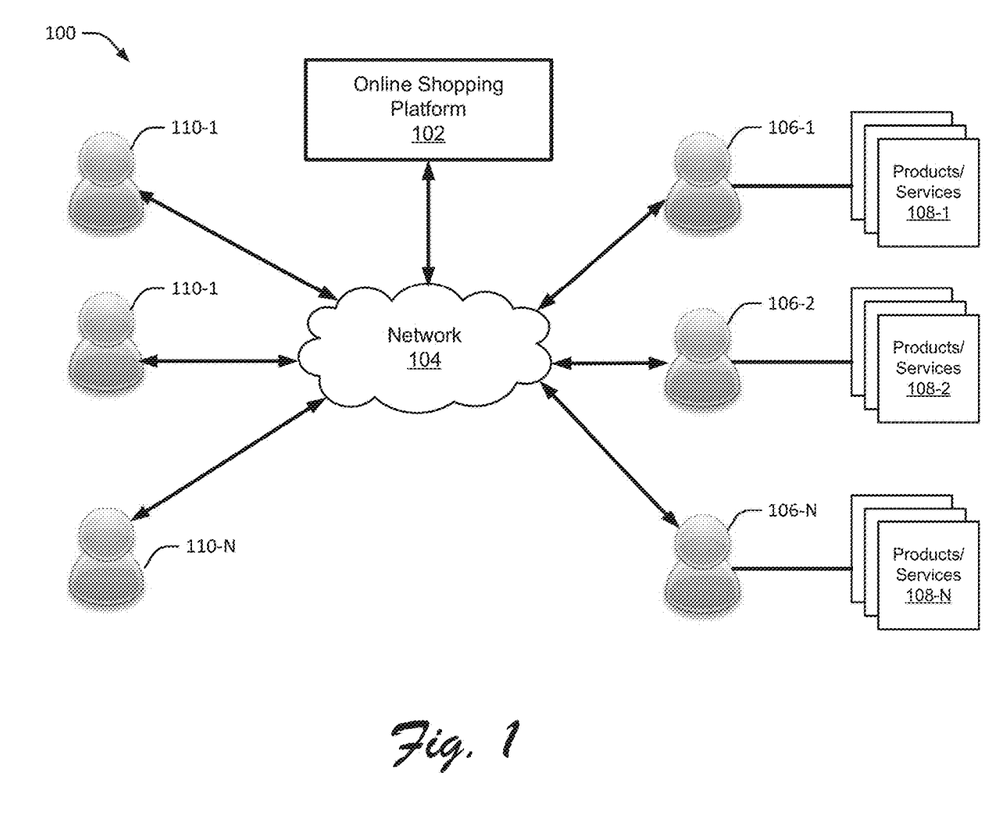
FIG. 1 illustrates an exemplary system.

FIG. 1 shows an example system 100 for item retrieval. The system 100 includes an online shopping platform 102. The shopping platform may be managed and operated by a vendor or group of vendors. In other implementations, the shopping platform may be managed and operated by a third party provider. It is to be understood that the online shopping platform 102 may reside on a server. The server, for example, may include one or more computing devices. In some implementations, the shopping platform may reside on a cloud, such as in a cloud-based computing environment. Other configurations of the shopping platform may also be useful. In one implementation, the online shopping platform 102 includes the specific retrieval module and the general retrieval module.

The online shopping platform 102 connects with a network 104. The network, for example, may be a cloud network. Other types of networks may also be useful. The network may be part of the World Wide Web and Internet. Connection to the network may be through, for example, the internet. The interconnect connection may be using a mobile telecommunication network, such as a 4G network or other types of telecommunication networks. Other types of connections to the network may also be useful.

Vendors 106 may connect to the network. For example, vendors 106 provide various products and/or services 108 for sale. Products and services may also be referred to as items or products. The products and/or services 108 of the respective vendors 106 be similar or unique from one another. Customers 110 may also connect to the network. Each customer 110 may have general inquiries and specific inquiries, from which recommendations of items are provided by the online shopping platform.

The platform may include a database for storing items from vendors. For example, a database may be provided to serve as a centralize storage for item listings from vendors. A vendor may list items by subscribing to the online shopping platform. Additionally, the database may be used for storing user behavior log. Providing separate databases for storing user behavior log and vendor item listings may also be useful. Other configurations of vendor item listings may also be useful.

Figure 2:
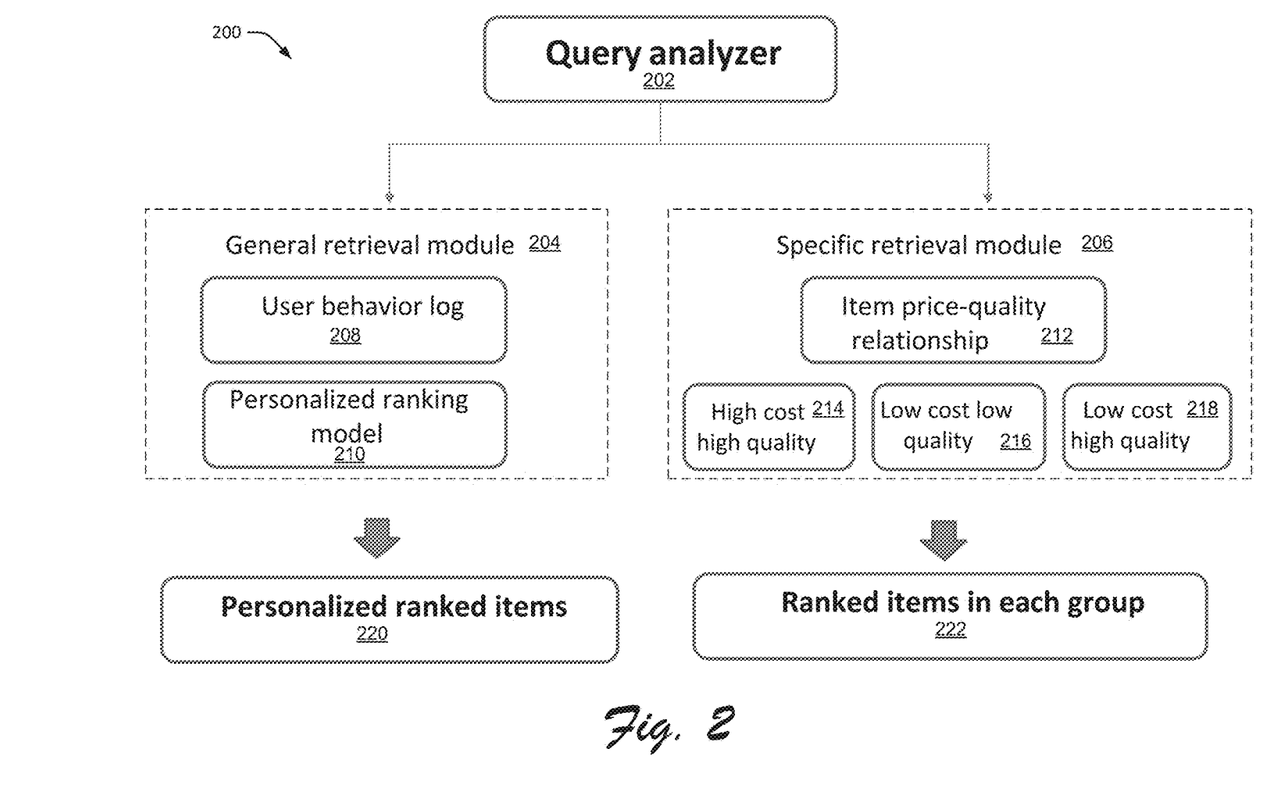
FIG. 2 illustrates an exemplary retrieval framework.

FIG. 2 shows an example retrieval framework 200 of the online shopping platform. The framework includes a query analyzer 202. The query analyzer 202 includes a general retrieval module 204 and a specific retrieval module 206.

The general retrieval module 204 includes a user behavior log component 208 and personalized ranking model component 210. The specific retrieval module 206 includes an item price-quality relationship component 212. The item price-quality relationship component includes a high cost high quality unit 214, a low cost low quality unit 216, and a low cost high quality unit 218.

The query analyzer analyzes a customer query. Depending on customer's query, the query analyzer 202 selects the general retrieval module 204 or the specific retrieval module 206. For example, if the query item is determined to be a general item query, the analyzer selects the general retrieval module 204. With the general retrieval module 204, the customer's preference may be inferred based on historical user behavior data found in the user behavior log component 208. The personalized ranking model component creates personalized ranked items 220. For example, personalized ranked items may be established to return retrieval results to the customer according to the historical behavior of the user stored in the user behavior log component.

If the query is determined to be a specific item query, the analyzer selects the specific retrieval module 206. For example, a specific query is a query in which a customer has a clear idea of purchasing a specific type of item. The specific retrieval module helps identify items for the customer, taken into account customer's insights from the specificity of the query. For example, a specific query may include a brand or cost level, indicating customer's desires. Using the specifics, the specific retrieval module determines items, for example, with various cost performance characteristics. In one implementation, the cost performance characteristics are determined by an item price-quality relationship component. Using various units of the module, items based on price-quality relationships are returned. For example, items may be categorized or grouped based on a high cost-high quality relationship, a low cost-low quality relationship and a low cost-high quality relationship. Other types of categorizations may also be useful. For example, there may be an additional group related to high cost-low quality items. However, high cost-low quality items may be left out due to their undesirable characteristics. In other implementations, the price-quality relationship can be translated to cost performance. For example, the cost performance may be based on low, moderate and high. In such cases, items with a low cost-high quality relationship may be categorized as high cost performance items. Such items may be prone to, for example, counterfeiting or being fake. Items having a high cost-low quality relationship may be categorized as low cost performance items. Customers generally would not select such items. As for the other categories, such as low cost-low quality or high cost-high quality, they may be categorized as moderate cost performance items. The results or items 222 of the search are ranked based on the relationship categories.

Certain advantages may be realized by the present shopping platform. For example, it may be possible to provide recommended items in an appropriate price interval to the customers who query a general category of item corresponding to their preference (historical behavior). For customers with more specific needs, they may be given recommendation as to selecting items with various cost performance based on their specific query. This platform assists online stores or vendors to match their products to target customer groups, based on their queries.

The information of vendor items may be stored in an items database. For example, a vendor items database may be provided as part of the shopping platform to store items from the various vendors. The items may be listed in a listing table with various columns corresponding to fields or attributes related to an item. For example, the different fields facilitate in categorizing the items to produce a personalized search result based on customer desires or preferences. The retrieval modules search the items database. Table 1 below shows various fields (columns) and brief description of the fields of an exemplary listing table:

TABLE 1

| Field Name | Description |
| --- | --- |
| Item ID | Identification number of an item |
| Cat ID | Category number of an item |
| Name | Name of an item (e.g., item type) |
| Brand ID | Brand ID number of an item |
| Price | Price of an item |
| Count | Click count, which is the click frequency of an item |
| Description | Description of an item |
| Image | Image of an item (e.g., url of the image of the item) |

The various fields listed relate to items. The fields enable categorization of items as well as information regarding the items. Categorizing the items produces a hierarchical category structure. This facilitates in producing a personalized search result, whether the search is by the general retrieval module or specific retrieval module of the online shopping platform. One of the fields is a primary key of the listings table. In one implementation, the item ID is a primary key, which has a unique value to uniquely identify an item. Providing other fields may also be useful. For example, a vendor ID field may be provided to identify the vendor listing the item. Other fields may also be included, depending on the granularity of the hierarchical category structure.

Figure 3:
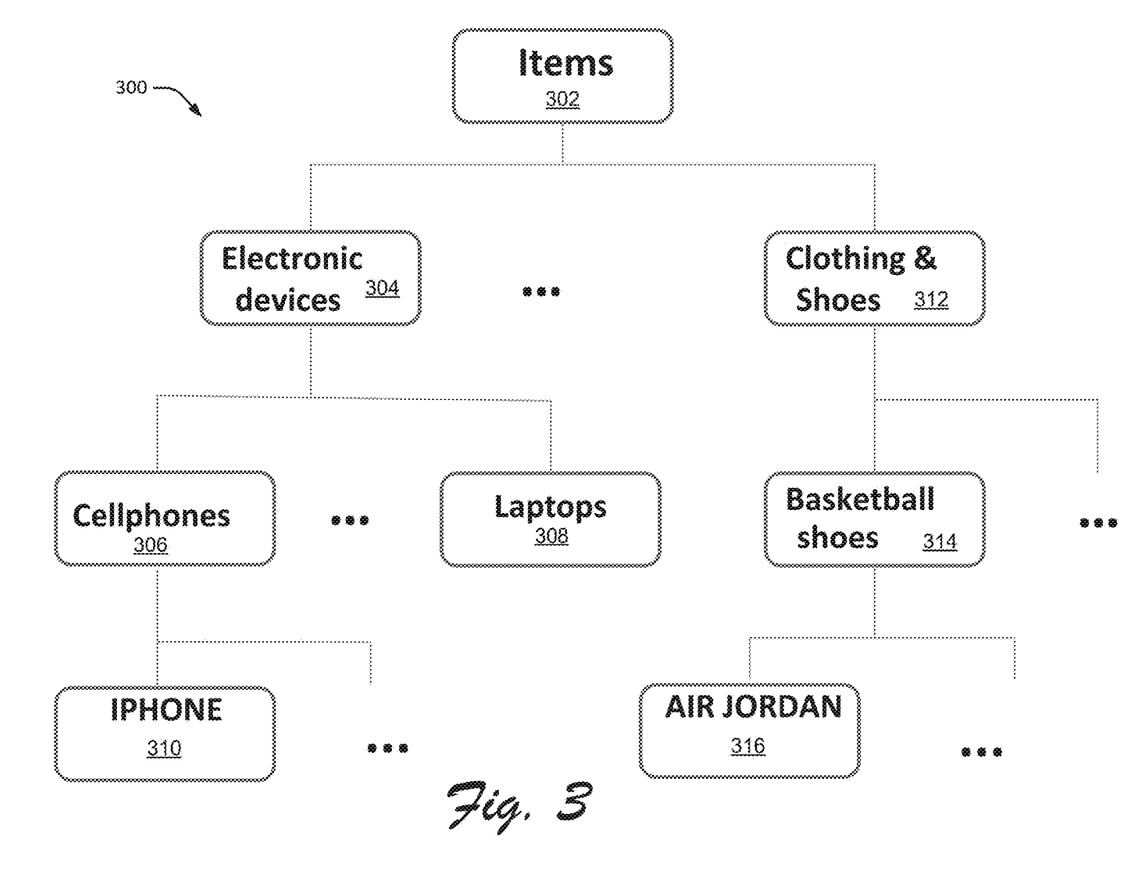
FIG. 3 illustrates an exemplary category structure.

Items in the listing table have a corresponding category. FIG. 3 shows a graphical example category structure 300 of items. In particular, structure 300 may be used with general retrieval module 204 and specific retrieval module 206 described in FIG. 2. The structure 300 includes multiple levels. As illustrated, the structure includes 4 levels. Providing category structures having other number of levels may also be useful. The number of level may depend on the desired category granularity. For example, more levels produces a finer granularity while less levels results in a coarser granularity. Category labels progress from general to specific items. For example, higher levels are more general while lower levels are more specific. As shown, the structure has top level group items 302. This group contains all items listed in the items table. Under items 302 is, for example, electronic devices 304. This level, for example, corresponds to the Cat ID field of the item listing table. Under electronics devices 304 are cell phones 306 and laptops 308. This level corresponds to the name field. Under cellphones 306 is iPHONE 310. This level, for example, corresponds to the brand ID field. In addition, under items 302 is clothing & shoes 312. Under clothing & shoes 312 is basketball shoes 314. Under basketball shoes 314 is AIR JORDAN 316. It is to be understood that other categories may exist at the various levels.

Figure 4:
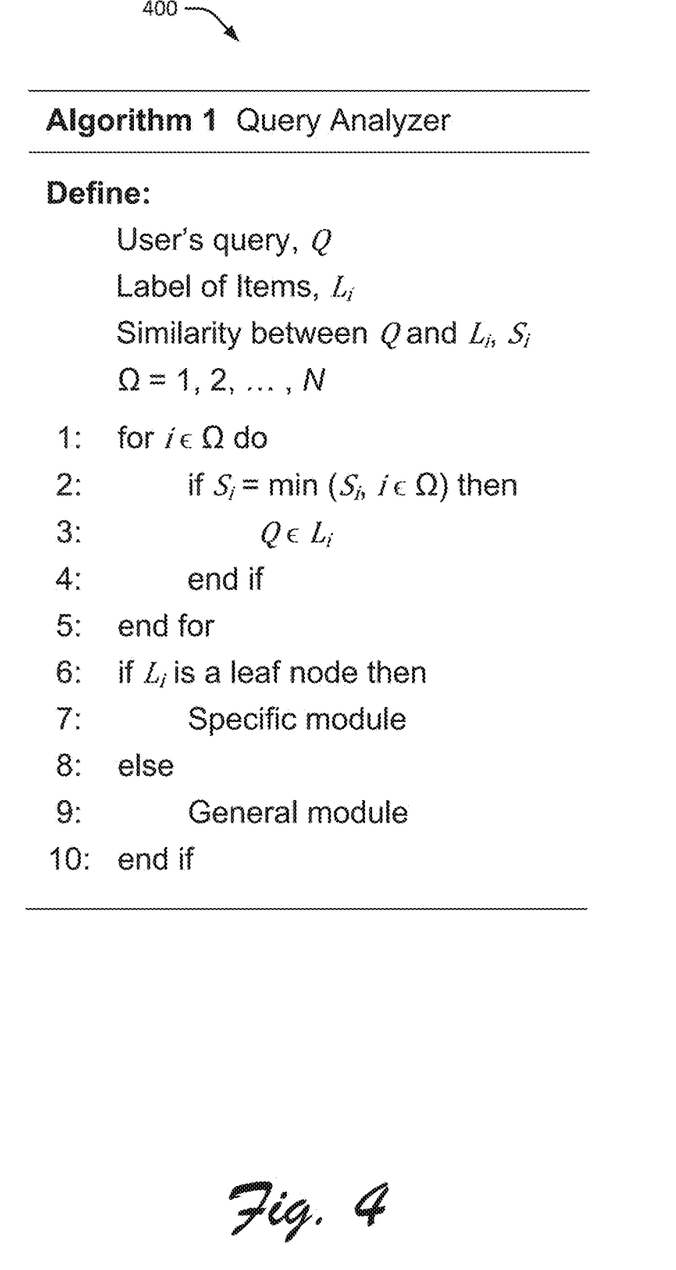
FIG. 4 illustrates an exemplary query analyzer algorithm.

The query analyzer 202 may be used to classify a query item into a certain category. Tokenization may be used as a core algorithm of the query analyzer 202. In particular, the concept of tokenization includes using a customer's query and breaking the query into keywords or tokens. With the keywords or tokens, the corresponding category labels of a query item may be found. The use of the general retrieval module 204 or the specific retrieval module 206 depends on the output of the query analyzer 202. An example a pseudocode 400 that may be implemented by the query analyzer is shown in FIG. 4.

The general retrieval module is directed to provide personalized recommendations to customers when they provide a query as to a general category of items. In one implementation, the general retrieval module returns results based on a certain price interval. Both off-line data (e.g., user behavior log 208) and online data (e.g., click-through data) may be used to optimize the retrieval or results by the general retrieval module. Click-through data, for example, is data that indicates which items of the search result a customer clicked on.

Figure 5:
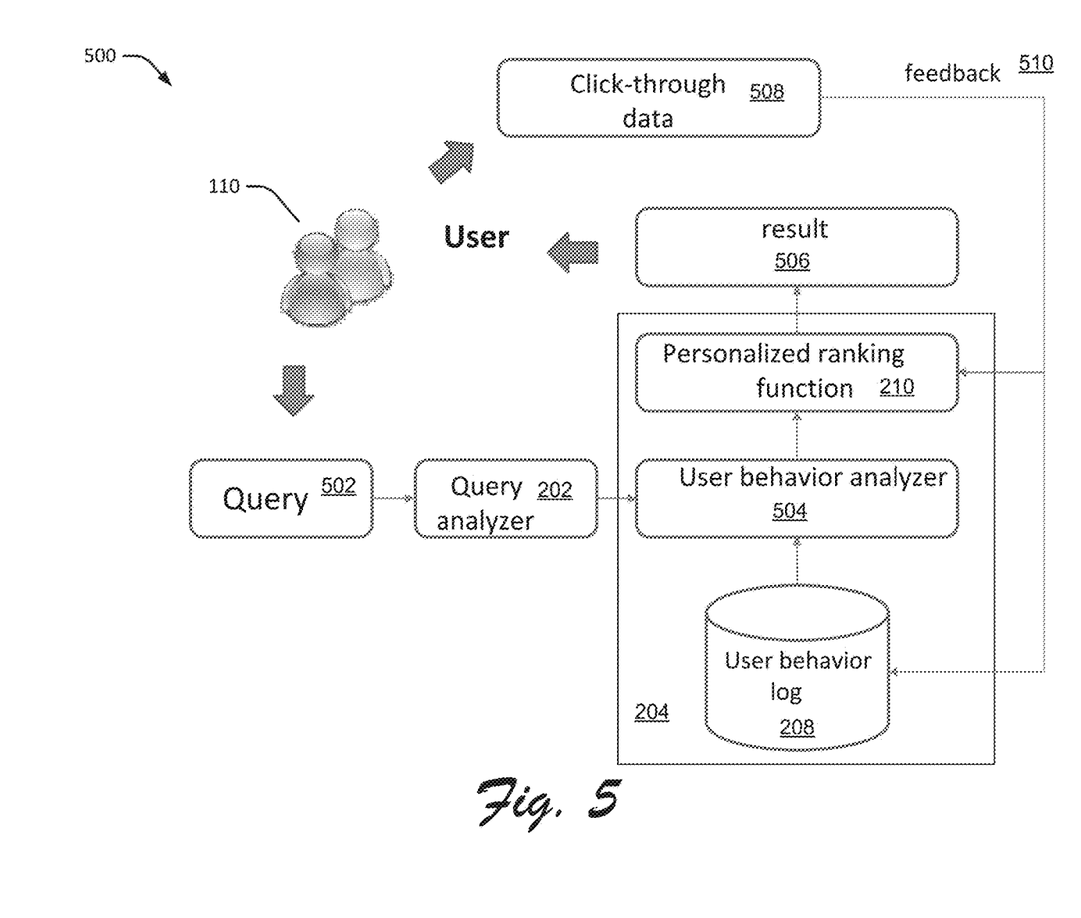
FIG. 5 illustrates an exemplary framework of general item retrieval.

FIG. 5 shows an example framework 500 of a general retrieval module 204. As shown, a user or customer provides a query 502 that is received by query analyzer 202. The query analyzer, for example, determines that the query is a general item query and selects the general retrieval module. A user behavior analyzer 504 receives data from query analyzer 202 and user behavior log 208. Such data, for example, includes categories and category information such as purchased items and prices. Other information may also be provided. Personalized ranking function/model 210 receives data from user behavior analyzer 504. A result 506 is formulated and sent to the user 110. Click-through data 508 may also provide respective feedback 510.

The query analyzer 202 is used to find the category label of a query item. The customer's purchase records under this category could be used as reference data to infer the customer's preference. In the event that the customer does not have any log data under the current category, purchase records of the customer in a higher level category may alternatively be used.

The user behavior analyzer 504 is used to derive an appropriate price range for the customer. The user behavior log data 208 are selected based on the output of the query analyzer 202. Assuming the customer purchased one item that belongs to the category of the reference data (e.g., category A), the lowest price of the items belonging to category A is denoted by $p_L$. The highest price of items that belongs to category A is denoted by $p_H$. The customer's purchasing price is denoted by $p_P$. By normalizing the price range of the items, the location of customer's purchasing price $L(p_P)$ in the whole price range can be derived by the following Equation 1:

$$L(p_P) = \frac{p_P - p_L}{p_H - p_L} \qquad \text{Equation 1}$$

Once $L(p_P)$ is determined, it may be used to infer the appropriate price interval of the customer. For the retrieved query items, the lowest price is denoted as $p_L^Q$ and the highest price is denoted as $p_H^Q$. By using $L(p_P)$, an estimate may be performed as to a possible purchasing price of the query item, which may be denoted as $p_E^Q$ in the following Equation 2:

$$p_E^Q = (p_H^Q - p_L^Q) * L(p_P) + p_L^Q \quad \text{Equation 2}$$

Based on the estimated purchasing price, a Gaussian type weight value may be derived using the following Equation 3:

$$w_p = e^{-\frac{(p - p_E^Q)^2}{2\sigma^2}} \quad \text{Equation 3}$$

where $p_E^Q$ denotes the expected purchasing price for an item, p is the price of retrieved item, and σ is a parameter which controls the length of the appropriate price interval.

Regarding σ, it may be determined by the online shopping platform. The personalized ranking function or model 210 ranks the search results. In one implementation, the ranking function is defined by the following Equation 4:

$$\text{score} = \Sigma_i w_i f_i \quad \text{Equation 4}$$

where $f_i$ denotes the factor which effect the ranking model,
$w_i$ denotes the corresponding weight value,
score denotes the score of the ranking function, and
i is the $i^{th}$ factor.

With the Gaussian type weights, a personalized ranking function can be established using Equation 5 as follows:

$$\text{score}_p = w_p * \text{score} \quad \text{Equation 5}$$

Items belonging to an inferred appropriate price interval may be assigned larger weight values while items outside the price interval may be assigned smaller weight values. As such, items belonging to the inferred price interval will have a larger rank score, resulting it being ranked higher.

As discussed, the appropriate price interval which the customer may prefer can be inferred. However, this estimation may not be sufficiently accurate. To improve accuracy, user or customer interaction may be used. For example, click-through data 508 may be used. In one implementation, after providing the ranked result to the customer 110, click-through data 508 of the customer 110 may be analyzed. For example, if the customer 110 only clicked the items belonging to the retrieval result, this may indicate that the customer 110 is satisfied with the personalized ranking model. On the other hand, if the customer 110 tries to find items in another price interval, this may indicate that the inferred price interval is not accurate. The price of items which the user selected manually may be used to modify the weight function of the ranking model. This, for example, may initiate another search. The search may be performed automatically or the platform may request the action from the customer. Other techniques for initiating the search may also be useful. The click-through data 508 is stored in the user behavior log 208. This may be used to improve subsequent searches by the user.

Figure 6:
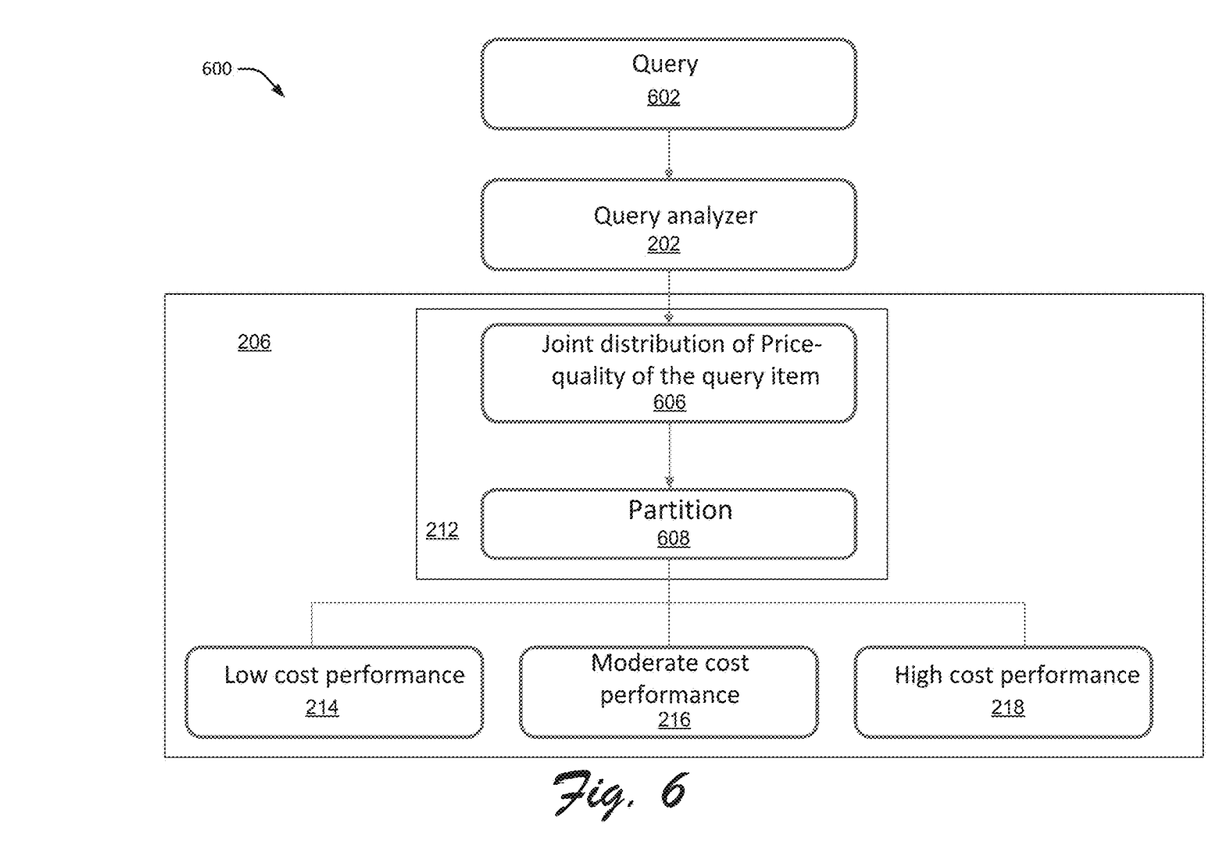
FIG. 6 illustrates an exemplary framework of specific item retrieval.

FIG. 6 shows an example framework 600 of a specific retrieval module 206. The specific retrieval module allows a customer to select items with, for example, good cost performances, when a customer query 602 is determined to be a specific item query by the query analyzer 202. The category label of a specific query item falls into a lower level in the category structure. The output of the query analyzer is passed to an item price-quality relationship component 212. The item price-quality relationship component includes a joint distribution of price-quality of the query item unit 606. The retrieved items are analyzed to determine its price and quality relationship.

To determine the price-quality relationship of an item, an item may include a quality rating. The quality of items are rated by, for example, users. For example, each item could be rated based on feedbacks from customers who have purchased the item. Alternatively, the quality may be rated based on brand. For example, each brand may be associated with a quality rating. Other techniques for deriving quality rating may also be useful. Quality may be rated using a quality scale. The quality scale, in one implementation, includes 5 levels. For example, the quality scale may be from levels 1 to 5, with 1 being the lowest and 5 being the highest. A quality table may be provided which lists the quality of different items.

The joint distribution of price-quality of the query item unit 606 generates a distribution of the items based on price and quality. The distribution may be achieved using clustering techniques such as k-means or Gaussian mixture model. Other techniques for generating a price-quality distribution of the items may also be useful. A partition unit 608 partitions the distribution of items into cost performance groups. In one implementation, the distribution of items are partitioned into three cost performance groups, low cost performance, moderate cost performance and high cost performance. Low cost performance items are provided to low cost performance unit 214, moderate cost performance items are provided to moderate cost performance unit 216 and high cost performance items are provided to the high cost performance unit 218. In other implementations, the items may be partitioned based on their price-quality relationship, such as high cost-high quality items, low cost-low quality items and low cost-high quality items. An additional group related to high cost-low quality items may also be included. However, high cost-low quality items may be left out due to their undesirable characteristics.

After the items are partitioned into groups, the items in each group may be ranked. For example, items are ranked within each group. Ranking may employ the ranking model of Equation 4, as previously discussed. The ranked results of the groups are provided to the user.

Figure 7:
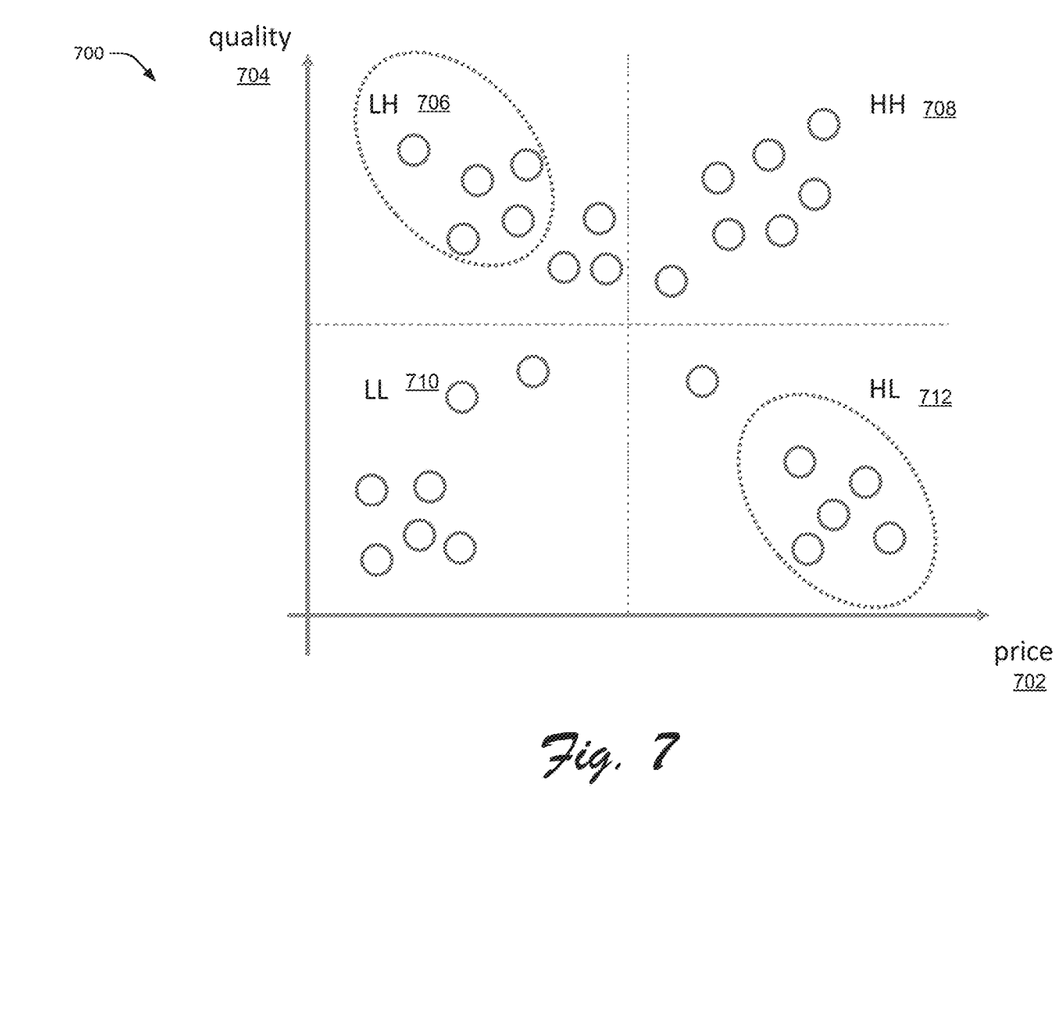
FIG. 7 illustrates an exemplary joint distribution of price versus quality for retrieved items.

FIG. 7 shows an example of a joint distribution 700 of price 702 versus quality 704 of the retrieved items. The items located in the first quadrant 706 have relative lower price and higher quality rating. An implication is that the items have good cost performances, but there is a potential that the items may be fake or counterfeit. The items located at the third quadrant 712 have relatively high price but low quality rating. That is, the items have bad cost performances and most people would not select them. The remaining items in quadrants 708 and 710 may be treated as having moderate cost performances.

Figure 8:
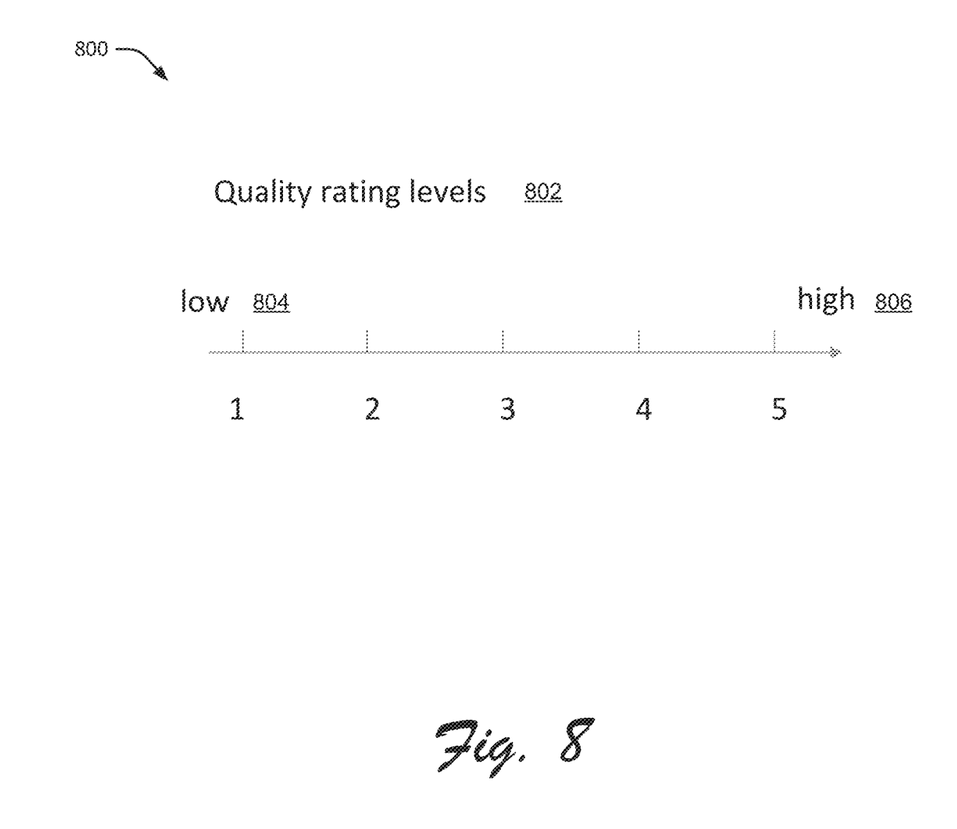
FIG. 8 illustrates an exemplary quality rating.

FIG. 8 shows an example quality rating 800 of an item. Quality rating level 802 is rated from low 804 to high 806. In this example, the rating is from 1 to 5, where 1 denotes lowest quality and 5 denotes highest quality.

Figure 9:
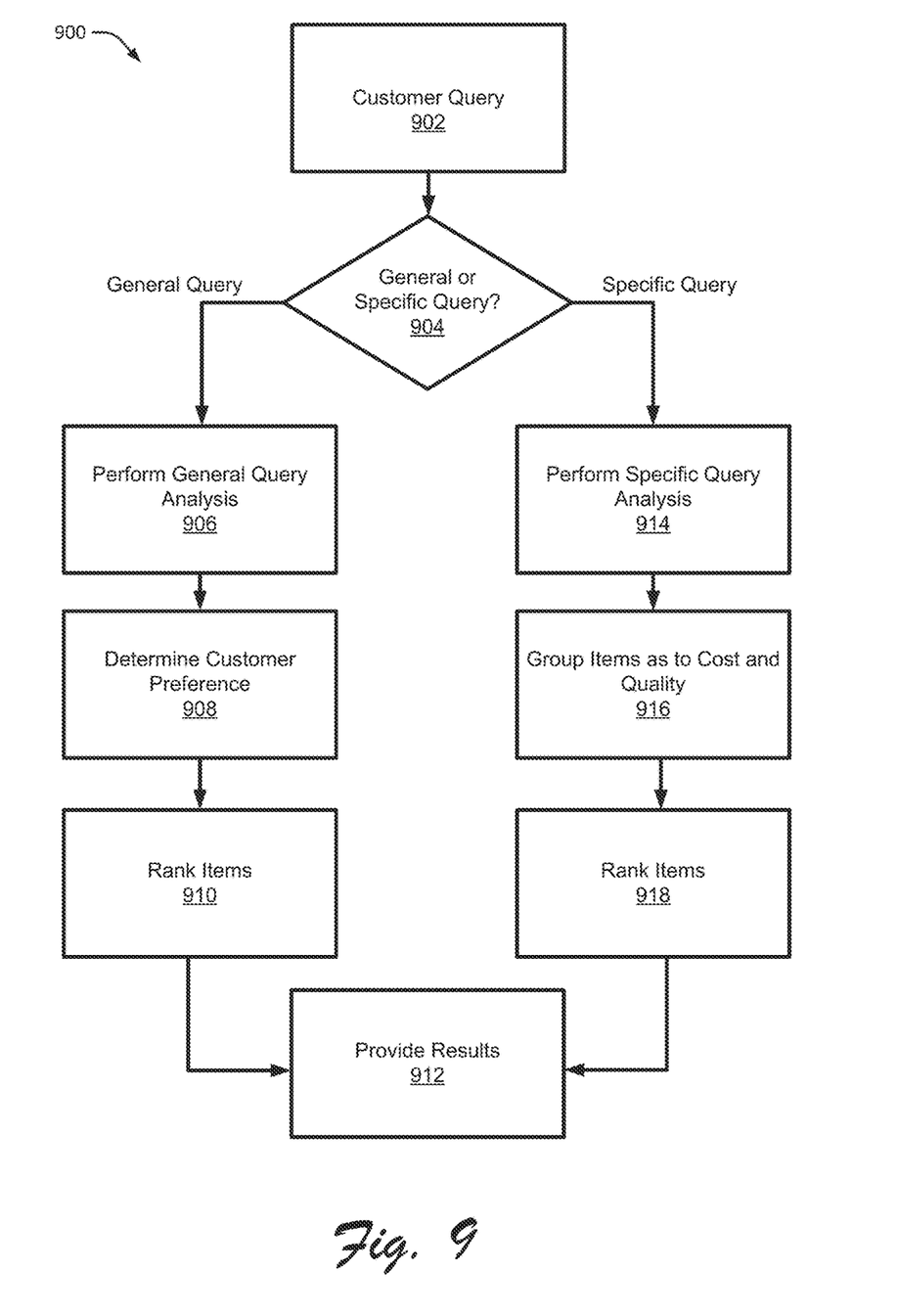
FIG. 9 illustrates an exemplary process for personalized search in an online shopping platform.

FIG. 9 shows an exemplary process 900 for a personalized search in an online shopping platform. The process 900 may be performed by a computing device. An example architecture of such a computer device is described below with reference to FIG. 10.

At step 902, a customer submits a query to the online shopping platform. The query, for example, is for an item of interest, such as for purchasing. The query is processed at step 904. For example, the query is processed by a query analyzer. The query analyzer determines if the query is a general or specific query. If the query is a general query, the process proceeds to step 906 for analysis. For example, the query is analyzed by the general retrieval module. The analysis includes determining customer preference at step 908. Customer preference, for example, is determined by the user behavior analyzer using the user behavior log. The retrieved items based on user behavior are ranked at step 910. For example, the ranking is performed by the personalized ranking model component. The ranked results are provided to the customer at step 912. For example, the ranked results are displayed on a browser or user interface of the user device accessing the online shopping platform.

On the other hand, if the query is a specific query, the process proceeds to step 914 for analysis. For example, the query is analyzed by the specific retrieval module. The analysis includes determining price-quality relationship of retrieved items at step 916. The price-quality relationship, for example, is determined by the item price-quality relationship unit. The items are grouped based on cost performance by a partition unit. For example, the items are grouped into low cost performance items, moderate cost performance items and high cost performance items. The retrieved items are ranked at step 918. For example, the ranking is performed for items in each group. The ranked results are presented to the customer at step 912.

Figure 10:
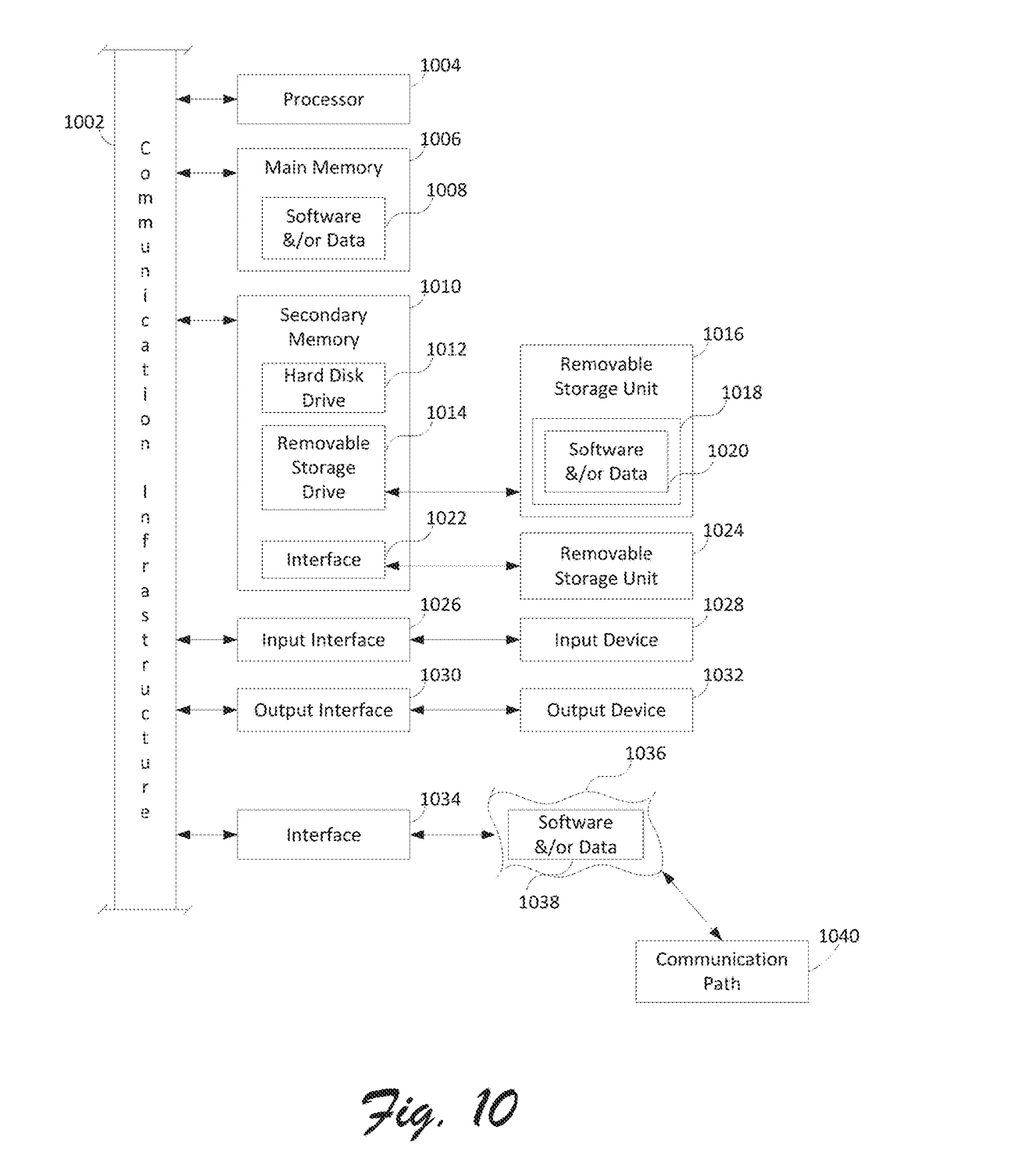
FIG. 10 illustrates an exemplary computing system.

FIG. 10 illustrates an exemplary system 1000 that may implement, at least in part, the technologies described herein. The computer system 1000 includes one or more processors, such as processor 1004. Processor 1004 can be a special-purpose processor or a general-purpose processor. Processor 1004 is connected to a communication infrastructure 1002 (for example, a bus or a network). Depending upon the context, the computer system 1000 may also be called a client device.

Computer system 1000 also includes a main memory 1006, preferably Random Access Memory (RAM), containing possibly inter alia computer software and/or data 1008.

Computer system 1000 may also include a secondary memory 1010. Secondary memory 1010 may include, for example, a hard disk drive 1012, a removable storage drive 1014, a memory stick, etc. A removable storage drive 1014 may comprise a floppy disk drive, a magnetic tape drive, an optical disk drive, a flash memory, or the like. A removable storage drive 1014 reads from and/or writes to a removable storage unit 1016 in a well-known manner. A removable storage unit 1016 may comprise a floppy disk, a magnetic tape, an optical disk, etc. which is read by and written to by removable storage drive 1014. As will be appreciated by persons skilled in the relevant art(s) removable storage unit 1016 includes a computer usable storage medium 1018 having stored therein possibly inter alia computer software and/or data 1020.

In alternative implementations, secondary memory 1010 may include other similar means for allowing computer programs or other instructions to be loaded into computer system 1000. Such means may include, for example, a removable storage unit 1024 and an interface 1022. Examples of such means may include a program cartridge and cartridge interface (such as that found in video game devices), a removable memory chip (such as an Erasable Programmable Read-Only Memory (EPROM), or Programmable Read-Only Memory (PROM)) and associated socket, and other removable storage units 1024 and interfaces 1022 which allow software and data to be transferred from the removable storage unit 1024 to computer system 1000.

Computer system 1000 may also include an input interface 1026 and a range of input devices 1028 such as, possibly inter alia, a keyboard, a mouse, etc.

Computer system 1000 may also include an output interface 1030 and a range of output devices 1032 such as, possibly inter alia, a display, one or more speakers, etc.

Computer system 1000 may also include a communications interface 1034. Communications interface 1034 allows software and/or data 1038 to be transferred between computer system 1000 and external devices. Communications interface 1034 may include a modem, a network interface (such as an Ethernet card), a communications port, a Personal Computer Memory Card International Association (PCMCIA) slot and card, or the like. Software and/or data 1038 transferred via communications interface 1034 are in the form of signals 1036 which may be electronic, electromagnetic, optical, or other signals capable of being received by communications 1034. These signals 1036 are provided to communications interface 1034 via a communications path 1040. Communications path 1040 carries signals and may be implemented using a wire or cable, fiber optics, a phone line, a cellular phone link, a Radio Frequency (RF) link or other communication channels.

As used in this document, the terms "computer-program medium," "computer-usable medium," and "computer-readable medium" generally refer to media such as removable storage unit 1016, removable storage unit 1024, and a hard disk installed in hard disk drive 1012. Computer program medium and computer usable medium can also refer to memories, such as main memory 1006 and secondary memory 1010, which can be memory semiconductors (e.g. Dynamic Random Access Memory (DRAM) elements, etc.). These computer program products are means for providing software to computer system 1000.

Computer programs (also called computer control logic) are stored in main memory 1006 and/or secondary memory 1010. Such computer programs, when executed, enable computer system 1000 to implement the present technology described herein. In particular, the computer programs, when executed, enable processor 1004 to implement the processes of aspects of the above. Accordingly, such computer programs represent controllers of the computer system 1000. Where the technology described herein is implemented, at least in part, using software, the software may be stored in a computer program product and loaded into computer system 1000 using removable storage drive 1014, interface 1022, hard disk drive 1012 or communications interface 1034.

The technology described herein may be implemented as computer program products comprising software stored on any computer useable medium. Such software, when executed in one or more data processing devices, causes data processing device(s) to operate as described herein. Embodiments of the technology described herein may employ any computer useable or readable medium, known now or in the future. Examples of computer useable mediums include, but are not limited to, primary storage devices (e.g., any type of random access memory), secondary storage devices (e.g., hard drives, floppy disks, Compact Disc Read-Only Memory (CD-ROM) disks, Zip disks, tapes, magnetic storage devices, optical storage devices, Microelectromechanical Systems (MEMS), and nanotechnological storage device, etc.).

A computing system may take the form of any combination of one or more of inter alia a wired device, a wireless device, a mobile phone, a feature phone, a smartphone, a tablet computer (such as for example an iPad™), a mobile computer, a handheld computer, a desktop computer, a laptop computer, a server computer, an in-vehicle (e.g., audio, navigation, etc.) device, an in-appliance device, a Personal Digital Assistant (PDA), a game console, a Digital Video Recorder (DVR) or Personal Video Recorder (PVR), a cable system or other set-top-box, an entertainment system component such as a television set, etc.

In the above description of exemplary implementations, for purposes of explanation, specific numbers, materials configurations, and other details are set forth in order to better explain the present invention, as claimed. However, it will be apparent to one skilled in the art that the claimed invention may be practiced using different details than the exemplary ones described herein. In other instances, well-known features are omitted or simplified to clarify the description of the exemplary implementations.

The inventors intend the described exemplary implementations to be primarily examples. The inventors do not intend these exemplary implementations to limit the scope of the appended claims. Rather, the inventors have contemplated that the claimed invention might also be embodied and implemented in other ways, in conjunction with other present or future technologies.

Moreover, the word "exemplary" is used herein to mean serving as an example, instance, or illustration. Any aspect or design described herein as exemplary is not necessarily to be construed as preferred or advantageous over other aspects or designs. Rather, use of the word "exemplary" is intended to present concepts and techniques in a concrete fashion. The term "technology," for instance, may refer to one or more devices, apparatuses, systems, methods, articles of manufacture, and/or computer-readable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

Note that the order in which the processes are described is not intended to be construed as a limitation, and any number of the described process blocks can be combined in any order to implement the processes or an alternate process. Additionally, individual blocks may be deleted from the processes without departing from the spirit and scope of the subject matter described herein.

One or more embodiments described herein may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The invention claimed is:

1. A computer-implemented method for providing personalized search in an online shopping platform comprising:
   receiving a query from a customer at the online shopping platform;
   analyzing the query by a query analyzer to determine a type of the query, wherein the type of the query is selected from a group consisting of a general item query and a specific item query;
   performing a search for items based on the query in an items database listing items offered for purchase, wherein performing the search includes, based on determining that the query is the specific item query, categorizing each of the items from results of the search into a respective one of a plurality of cost performance categories based on cost performance for each item, wherein the cost performance for a respective item includes a price-quality relationship indicating a proportion of price to quality for the respective item;
   retrieving most relevant items as a search result from the items database based on the performed search and the type of the query;
   ranking the most relevant items of the search result based at least partly on the respective cost performance categories of the most relevant items, including ranking the most relevant items based at least partly on the price-quality relationship indicating the proportion of price to quality for each of the most relevant items;
   providing the ranked items to the customer at a user interface of a device connected to the online shopping platform;
   storing data for user off-line and online behavior in a behavior log at the items database, wherein the data includes click-through data that indicates which of the provided ranked items the customer clicked on, and wherein the click-through data includes data for selection interactions of the customer after providing the ranked items as the search result;
   optimizing retrieval of search results for searches requested by the customer based on the stored data for user off-line and online behavior to determine an optimized search result; and
   initiating an optimized search to determine a different set of items compared to the ranked items, wherein the optimized search is associated with the query.

2. The computer-implemented method of claim 1 wherein:
   performing the search using the general item query comprises performing a general item search by a general retrieval module; and
   performing the search using the specific item query comprises performing a specific item search by a specific retrieval module.

3. The computer-implemented method of claim 2 wherein performing the general item search comprises:
   retrieving general search items from the items database based on the general item query;
   determining customer preference by a behavior analyzer using the behavior log of the customer; and
   ranking the general search items by a personalized ranking function taking account of the customer preference.

4. The computer-implemented method of claim 3 wherein determining customer preference comprises:

deriving an appropriate price interval for the customer from the behavior log of the customer; and
generating Gaussian weight values for general search items.

5. The computer-implemented method of claim 4 wherein ranking comprises:
calculating ranking scores for the general search items using the personalized ranking function and the Gaussian weight values; and
ranking the items based on the ranking scores of the items.

6. The computer-implemented method of claim 4 further comprising:
adjusting the appropriate price interval using real-time data.

7. The computer-implemented method of claim 6 wherein the real-time data comprises click through data of the customer.

8. The computer-implemented method of claim 2 wherein performing the specific item search comprises:
retrieving specific search items from the items database based on the specific item query;
determining a distribution of price-quality relationship of the specific search items; and
grouping the specific search items into groups based on cost performance using the distribution.

9. The computer-implemented method of claim 8 wherein:
items in the items database comprise prices of the items;
the online shopping platform comprises a quality rating of items in the items database; and
determining the distribution of price-quality relationship takes into account of quality and pricing of the items.

10. The computer-implemented method of claim 9 wherein grouping comprises grouping items into low cost performance, moderate cost performance and high cost performance groups.

11. The computer-implemented method of claim 8 further comprising ranking specific search items within each group based on customer preference.

12. The computer-implemented method of claim 1 wherein the database stores items in an items table comprising:
category fields for categorizing items; and
a price field containing a price of the items.

13. The computer-implemented method of claim 1 wherein:
items in the items database comprise category levels to facilitate search using general and specific item queries; and
the category levels comprise item level, category level, name level and brand level.

14. An online shopping platform comprising:
a query analyzer for receiving a search query from a customer, the query analyzer analyzes the query to determine a type of query, wherein the type of the query is selected from a group consisting of a general item query and a specific item query;
an items database storing items offered for sale;
a general retrieval module comprising:
a user behavior component for determining customer preference of the customer,
a personalized ranking model component for ranking results retrieved from the items database, and
a user behavior log to store data for user off-line and online behavior, wherein the data includes click-through data that indicates which of the provided ranked items the customer clicked on, and wherein the click-through data includes data for selection interactions of the customer after providing the ranked items as the search result;
wherein the general retrieval module retrieves relevant items as a search result from the items database based on the performed search and the type of executed query;
wherein the general retrieval module searches the items database and returns a general search result containing general search items based on the general item query, the general search result items are ranked based on the customer preference to generate a personalized ranked general search result;
a specific retrieval module comprising an item price-quality relationship component, wherein the specific retrieval module searches the items database and returns a specific search result containing specific search items based on the specific item query, wherein each of the specific search items are categorized, based on cost performance for each item, into a respective one of a plurality of cost performance categories, wherein the cost performance for a respective item includes a price-quality relationship indicating a proportion of price to quality for the respective item; and
a user interface module to provide ranked items to the customer, wherein the user interface is provided on a device connected to the online shopping platform, wherein the items are ranked based at least partly on the respective cost performance categories of the items, including ranking the items based at least partly on the price-quality relationship indicating the proportion of price to quality for each of the items;
wherein the general retrieval module is operable to optimize retrieval of search results for performed searches based on the stored data for user off-line and online behavior at the user behavior log and to determine an optimized search result, wherein the general retrieval module is operable to initiate an optimized search to determine a different set of items compared to the ranked items, wherein the optimized search is associated with the query.

15. The online shopping platform of claim 14 wherein the user behavior component analyzes the user behavior log of the customer to determine the customer preference.

16. The online shopping platform of claim 15 wherein the personalized ranking model component:
calculates an appropriate price interval for the customer from the user behavior log of the customer;
generates Gaussian weight values for the general search items;
calculates ranking scores for the general search items using a personalized ranking function with the Gaussian weight values; and
ranks the general search items based on the ranking scores of the general search items.

17. The online shopping platform of claim 14:
comprising a quality table rating quality of items in the items database; and
wherein
items in the items database comprise pricing of the items, and
the item price-quality relationship component
generates a distribution of price-quality relationship based on quality rating and pricing of the specific search items, and
groups the specific search items into cost performance groups based on the distribution.

18. The online shopping platform of claim 14 wherein the specific search items in the cost performance groups are ranked based on customer preference.

19. A non-transitory computer-readable medium having stored thereon program code which, when executed by a computer, causes the computing to perform operations for providing personalized search in an online shopping platform, the operations comprising;
   receiving a query from a customer by the online shopping platform;
   analyzing the query by a query analyzer to determine whether the query is a general item query or a specific item query;
   based on determining that the query is the general item query, performing a general item search in an items database including items offered for sale by a general retrieval module using the general item query to retrieve general search items, wherein performing the general item search includes retrieving most relevant items as the general search items from the items database, wherein performing the general item search includes ranking the general search items based on customer preference;
   based on determining that the query is the specific item query,
      performing a specific item search in the items database by a specific retrieval module using the specific item query to retrieve specific search items,
      categorizing each of the specific search items into a respective one of a plurality of cost performance categories based on cost performance, and ranking the specific search items based at least partly on the respective cost performance categories of the specific search items, wherein the cost performance for a respective item includes a price-quality relationship indicating a proportion of price to quality for the respective item, and wherein the ranking of the specific search items includes ranking the specific search items based at least partly on the price-quality relationship indicating the proportion of price to quality for each of the specific search items;
   based on an executed search, providing ranked items to the customer at a user interface of a device connected to the online shopping platform;
   storing data for user off-line and online behavior in a behavior log at the items database, wherein the data includes click-through data that indicates which of the provided ranked items the customer clicked on, and wherein the click-through data includes data for selection interactions of the customer after providing the ranked items as the search result;
   optimizing retrieval of search results for searches requested by the customer based on the stored data for user off-line and online behavior to determine an optimized search result; and
   initiating an optimized search to determine a different set of items compared to the ranked items, wherein the optimized search is associated with the query.

20. The non-transitory computer-readable medium of claim 19 the operations further comprising determining customer preference including:
   deriving an appropriate price interval for the customer from a behavior log of the customer; and
   generating Gaussian weight values for general and specific search items.

* * * * *